(12) United States Patent
Lauer

(10) Patent No.: US 11,528,403 B2
(45) Date of Patent: Dec. 13, 2022

(54) NETWORKED CAMERAS CONFIGURED FOR CAMERA REPLACEMENT

(71) Applicant: SICK AG, Waldkirch (DE)

(72) Inventor: Roman Lauer, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/194,606

(22) Filed: Mar. 8, 2021

(65) Prior Publication Data

US 2021/0306567 A1    Sep. 30, 2021

(30) Foreign Application Priority Data

Mar. 31, 2020   (DE) .......................... 102020108910.4

(51) Int. Cl.
  *H04N 5/232*   (2006.01)
  *G06K 7/10*    (2006.01)
  *G06K 7/14*    (2006.01)
  *H04N 5/247*   (2006.01)

(52) U.S. Cl.
  CPC ... *H04N 5/232061* (2018.08); *G06K 7/10722* (2013.01); *G06K 7/1413* (2013.01); *H04N 5/23225* (2013.01); *H04N 5/247* (2013.01)

(58) Field of Classification Search
  CPC ......... H04N 5/232061; H04N 5/23225; H04N 5/247; H04N 7/181; G06K 7/10722; G06K 7/1413
  See application file for complete search history.

(56) References Cited

U.S. PATENT DOCUMENTS

2015/0341210 A1*  11/2015  Ranbro ............... H04L 41/0809
                                                         709/222
2016/0286134 A1    9/2016  Ardo et al.

FOREIGN PATENT DOCUMENTS

| CN | 105282427 A    | 1/2016  |
| CN | 110243397 A    | 9/2019  |
| DE | 102005049483 A1 | 4/2007  |
| DE | 102011051212 A1 | 12/2011 |
| DE | 102012107673 A1 | 5/2014  |
| EP | 2950285 A1     | 12/2015 |
| JP | 2004-96580 A   | 3/2004  |
| JP | 2008-85776 A   | 4/2008  |
| JP | 2013187725 A   | 9/2013  |
| KR | 10-2029855 B1  | 10/2019 |

* cited by examiner

*Primary Examiner* — Antoinette T Spinks
(74) *Attorney, Agent, or Firm* — Nath, Goldberg & Meyer; Jerald L. Meyer; Morgan D. Rosenberg

(57) ABSTRACT

A camera is provided that has an image sensor for recording image data from a field of vision, a communication interface for connection to at least one further camera in a network, a control and evaluation unit for reading the image data, and a memory in which a parameter set for the operation of the camera is stored, At least one further parameter set for the operation of at least one further camera of the network is stored in the memory here.

14 Claims, 6 Drawing Sheets

Figure 3

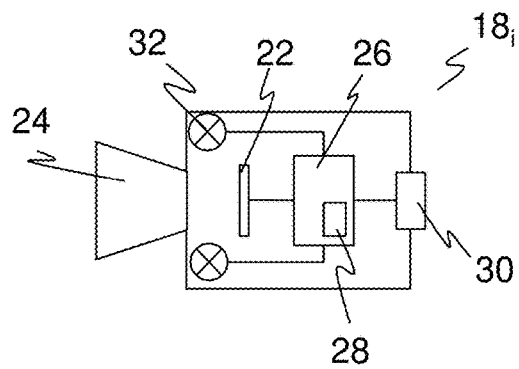

Figure 4

Figure 1:
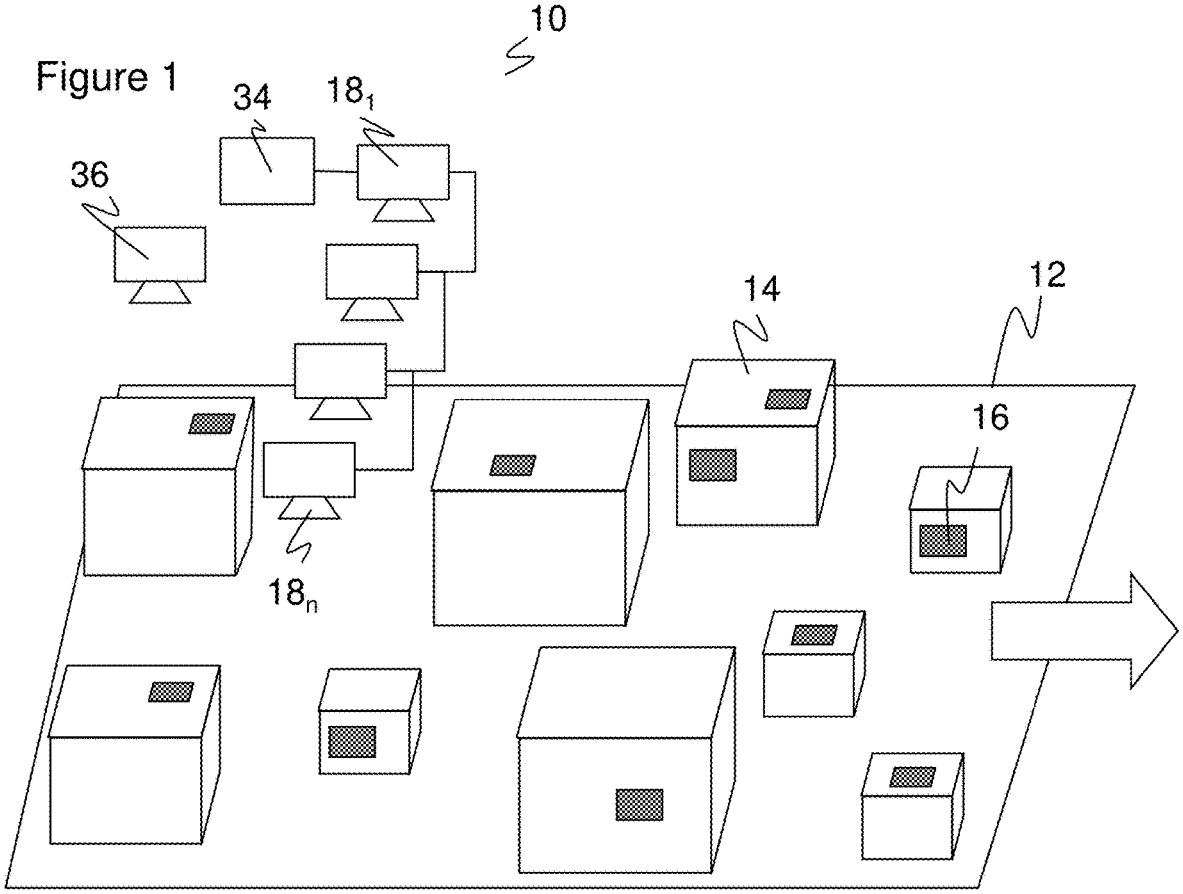

```
┌─────────────────────────────────┐
│ Disseminate network configuration │ ～ S1
└─────────────────────────────────┘
                ↓
┌─────────────────────────────────┐
│      Disseminate device map      │ ～ S2
└─────────────────────────────────┘
                ↓
┌─────────────────────────────────┐
│   Mutually communicate and       │ ～ S3
│     store parameter sets         │
└─────────────────────────────────┘
```

Figure 5

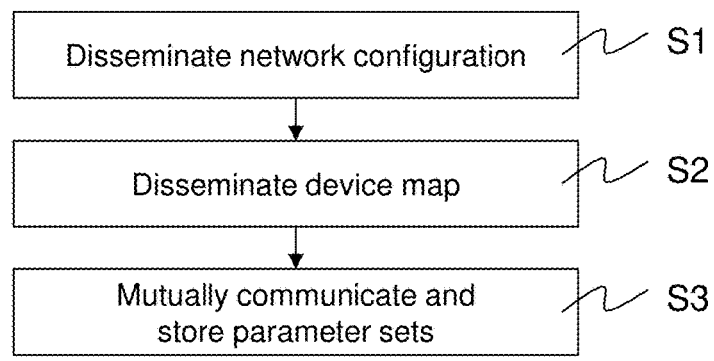

| | $18_1$ | | $18_n$ |
|---|---|---|---|
| Serial number | 2005 0001 | 2005 0002 | 2005 0003 |
| IP address | 192.168.0.1 | 192.168.0.2 | 192.168.0.3 |
| Node ID | 1 | 2 | 3 |
| Device map | 2005 0002/*.*.*.2/2<br>2005 0003/*.*.*.3/3 | 2005 0001/*.*.*.1/1<br>2005 0003/*.*.*.3/3 | 2005 0001/*.*.*.1/1<br>2005 0002/*.*.*.2/2 |
| Parameters for | 2 (2005 0002)<br>3 (2005 0003) | 1 (2005 0001)<br>3 (2005 0003) | 1 (2005 0001)<br>2 (2005 0002) |

Figure 12 

| Serial number | 2005 0001 | 2005 0002 | 2006 0129 |
|---|---|---|---|
| IP address | 192.168.0.1 | 192.168.0.2 | 192.168.0.6 |
| Node ID | 1 | 2 | 7 |
| Device map | 2005 0002/\*.\*.\*.2/2<br>2005 0003/\*.\*.\*.3/3 | 2005 0001/\*.\*.\*.1/1<br>2005 0003/\*.\*.\*.3/3 | **2006 0041/\*.\*.\*.4/4<br>2006 0045/\*.\*.\*.2/2** |
| Parameters for | 2 (2005 0002)<br>3 (2005 0003) | 1 (2005 0001)<br>3 (2005 0003) | 4 (2006 0041)<br>2 (2006 0045) |

Figure 13 

| Serial number | 2005 0001 | 2005 0002 | 2006 0129 |
|---|---|---|---|
| IP address | 192.168.0.1 | 192.168.0.2 | 192.168.0.3 |
| Node ID | 1 | 2 | 3 |
| Device map | 2005 0002/\*.\*.\*.2/2<br>2005 0003/\*.\*.\*.3/3 | 2005 0001/\*.\*.\*.1/1<br>2005 0003/\*.\*.\*.3/3 | 2006 0041/\*.\*.\*.4/4<br>2006 0045/\*.\*.\*.2/2 |
| Parameters for | 2 (2005 0002)<br>3 (2005 0003) | 1 (2005 0001)<br>3 (2005 0003) | 4 (2006 0041)<br>2 (2006 0045) |

Figure 14 

| Serial number | 2005 0001 | 2005 0002 | 2006 0129 |
|---|---|---|---|
| IP address | 192.168.0.1 | 192.168.0.2 | 192.168.0.3 |
| Node ID | 1 | 2 | 3 |
| Device map | 2005 0002/\*.\*.\*.2/2<br>**2006 0129/\*.\*.\*.3/3** | 2005 0001/\*.\*.\*.1/1<br>**2006 0129/\*.\*.\*.3/3 | 2005 0001/\*.\*.\*.1/1<br>2005 0002/\*.\*.\*.2/2** |
| Parameters for | 2 (2005 0002)<br>3 (2005 0003) | 1 (2005 0001)<br>3 (2005 0003) | 4 (2006 0041)<br>2 (2006 0045) |

Figure 15 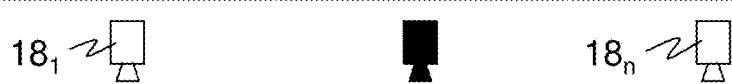

| Serial number | 2005 0001 | 2005 0002 | 2006 0129 |
|---|---|---|---|
| IP address | 192.168.0.1 | 192.168.0.2 | 192.168.0.3 |
| Node ID | 1 | 2 | 3 |
| Device map | 2005 0002/\*.\*.\*.2/2<br>2006 0129/\*.\*.\*.3/3 | 2005 0001/\*.\*.\*.1/1<br>2006 0129/\*.\*.\*.3/3 | 2005 0001/\*.\*.\*.1/1<br>2005 0002/\*.\*.\*.2/2 |
| Parameters for | 2 (2005 0002)<br>3 (2006 0129) | 1 (2005 0001)<br>3 (2006 0129) | 1 (2005 0001)<br>2 (2005 0002) |

NETWORKED CAMERAS CONFIGURED FOR CAMERA REPLACEMENT

The invention relates to a camera and to a method of replacing a camera.

Sensors are used for the automation of processes at a conveyor belt to detect object properties of the conveyed objects and to initiate further processing steps in dependence thereon. The processing in logistics automation typically comprises a sorting; for instance, in automatic parcel identification, for mail shipments, or baggage handling at airports. In addition to general information such as volume and weight of the objects, an optical code applied to the object frequently serves as the most important source of information. In other cases, it is a question of an inspection or of a quality check in which an optical code can take part, but does not have to.

As digital camera technology develops further, camera-based code readers are increasingly used for code reading. Instead of scanning code regions such as in a barcode scanner, a camera-based code reader takes images of the objects having the codes located thereon with the aid of a pixel-resolved image sensor and image evaluation software extracts the code information from these images. Camera-based code readers also cope without problem with different code types than one-dimensional barcodes which also have a two-dimensional structure like a matrix code and provide more information. In an important application group, the objects bearing the code are conveyed past the code reader. A camera reads the object images having the code information successively with the relative movement.

An individual camera is often not sufficient to record all the relevant information on the objects on a conveying belt. A plurality of sensors are therefore combined in a reading system or a reading tunnel. If a plurality of conveyor belts are disposed next to one another to increase the object throughput or if a widened conveyor belt is used, a plurality of sensors mutually complement one another with respect to their fields of view, which are narrow per se, to cover the total width. In addition, cameras are installed at different perspectives to record codes from all sides (omni reading).

It occurs again and again in the course of operation that one of the cameras has to be replaced, for example due to a defect. For this event, the camera conventionally saves its configuration or parameters on an SD card. On replacement, the SD card is then inserted into the new device that thus takes over the settings of its predecessor and is directly ready for operation.

However, when considered exactly, the replacement is not as simple and robust as would be desired. A screwdriver is required to open the old device on the removal of the SD card and the same is used for insertion into the replacement device. This is cumbersome and as a rule does not take place in an ESD-protected environment so that further damage can occur. Handling a micro-SD card is awkward, it can be lost or the wrong micro-SD card is accidentally installed. The risk of confusion is also present because the replacement device is itself delivered with its own micro-SD card that is actually not used in the case of replacement and that is left over. Finally, damage to the micro-SD card of the old device is conceivable that can be affected on a defect so that the parameter transfer then fails or even transfers false values in an unnoticed manner.

Different other hardware modules instead of an SD card are known in the prior art to save parameters for a replacement device. DE 10 2005 049 483 A1 is named only as an example that discloses an electrical plug for a decentral storage of the parameters of a sensor. However, the disadvantages are substantially the same.

A replacement of field devices in a process management system is described in DE 10 2011 051 212 A1. Configuration data are here transmitted to a replaced field device. These configuration data do not, however, come from a central configuration system. The architecture of a process management system differs greatly from that with cameras for code reading.

DE 10 2012 107 673 A1 discloses a method of replacing a field device with the aid of a mobile end device. The parameter set to be transmitted to the replacement device is here stored on a web server with which the end device imparts the communication. In this case, a very complex network structure with a central storage of the parameters is also used.

It is therefore the object of the invention to simplify the replacement of a camera.

This object is satisfied by a camera and by a method for replacing a camera in accordance with the respective independent claim. The camera has an image sensor with which image data of a field of vision are recorded. The camera is connected to a network having further cameras and possibly further devices such as a higher ranking control via a communication interface in operation. A control and evaluation unit reads image data from the image sensor. Depending on the embodiment, the image data are pre-processed or evaluated and the control and evaluation unit takes care of the coordination of the functions of the camera. A parameter set for the operation of a camera is stored in a memory.

The invention starts from the basic idea that the camera still saves at least one further parameter set for a further camera. If that further camera is later replaced, for example after a failure, its parameter set is still available in the network.

The invention has the advantage that a particularly robust saving and transfer of parameters is made possible that is easy to handle. A kind of crowd-based parameter cloning is made possible by the decentral storage in a camera of the network. This is in particular of interest in the event of a defect and replacement of a camera where the invention results in a substantial simplification and acceleration, but also, for example, in the event of an accidental incorrect configuration or a deletion of parameters in a camera. The disadvantages of conventional storage on an SD card are in particular avoided since no device has to be opened, the old SD card cannot be accidentally lost, and a new SD card is not left over. No physical handling at all is necessary to transfer the parameters from the one camera to the other.

The parameter set is, for example, the result of a calibration or configuration. There are a plurality of possible parameters of which objective corrections, filters, a separate position of the camera, an image resolution, an output format for image data, focus settings, and regions of interest (ROIs) are named purely by way of example. Those data are called a parameter set here that are saved for a mutual transfer between the cameras. There can be further parameters that are not treated in this manner, for instance those such as parameters for correcting production tolerances of the optics in which saving is meaningless because they only apply to exactly this camera and would not be usable in a replacement device. The parameter sets preferably have the same format or include the same parameter types; however differently set up parameter sets for different camera types are also conceivable.

A network configuration is preferably stored in the memory. The network configuration includes information such as an IP address or a CAN node ID and the like and makes it possible for the camera to take part in communications in the network. The network configuration can be part of the parameter set that is provided for a mutual saving and transfer. If the network configuration is transferred to a replacement device, the replacement device appears as its predecessor with respect to the network. However, there is possibly a chicken-and-egg problem in dependence on the network architecture since data can only be transferred to the replacement device after it has become a participant in the network. This can be solved by a provisional network configuration. Alternatively, the network configuration is not treated as part of the parameter set, but a network configuration is communicated to a replacement device by a mechanism by means of a cloning master that will be presented later.

A device map having the at least one further camera is preferably stored in the memory, with the device map comprising the cameras that mutually save a parameter set for one another. The device map is a table or the like having identifications or addresses of the further cameras and is in no way to be confused with a physical card such as an SD card. The device map can be saved like the network configuration as part of the parameter set and can be transferred between cameras or modified by means of a cloning master.

Further parameter sets for the operation of at least two further cameras of the network are preferably stored in the memory. A plurality of cameras therefore form a kind of cloning network with mutual saving and a transfer possibility of their respective parameter sets. The cloning network can comprise all the cameras of a system or only a partial group. Since every parameter set is saved at least twice in a respective different camera, a single failure can no longer result in the loss of a parameter set. It is extremely unlikely that a camera has to be replaced and both partners simultaneously fail together with their saved parameter sets. A system of cameras having this embodiment is therefore even less susceptible to error and is even more reliable.

The control and evaluation unit is preferably configured to recognize a camera replacement in the network when a further camera is no longer connected in the network and a new camera is subsequently connected in the network. Such a camera is therefore able to independently recognize when it is necessary to respond to a camera replacement. The initiative thus starts from the camera itself in accordance with the crowd-based approach and thus neither from the replacement device nor from a central station. However, a message of the replacement device by which a transfer of a parameter set is requested would be conceivable provided that the network architecture permits such messages or as soon as the replacement device can at least provisionally communicate in the network.

The control and evaluation unit is preferably configured to report itself to the network on recognition of a camera replacement as a master for the integration of the new camera into the network. This camera is also called a cloning master since it is responsible for the coordination during the integration of the new camera into the network and for the mutual transfer of parameter sets. The first camera that notices the camera replacement preferably becomes the cloning master. It at least only names itself the cloning master as long as no other camera has done so. The provisional function of the cloning master at best only randomly overlaps with a possible master of the network for the actual operation if just the actual master first notices a camera replacement of a further camera for which it has stored a parameter set.

The control and evaluation unit is preferably configured to communicate the network configuration of the no longer connected further camera to the new camera. In this function, the camera has preferably taken over the role of the cloning master. The new camera becomes a participant in the network by the handing over of the network configuration. Just the network configuration of the replaced device is preferably transferred so that the new camera can equally be addressed as before.

The control and evaluation unit is preferably configured to communicate an updated device map to the network including the new camera. This is also preferably done in the function of the cloning master. The older camera is deleted from and the new camera entered in the device map. This is communicated to all the cameras so that those cameras that are affected by the replacement again have an updated device map. The new camera also receives an updated device map at this opportunity.

The control and evaluation unit is preferably configured to transfer the further parameter set stored for the previously connected further camera to the new camera. This step, again preferably in the function as a cloning master, relates to the actual transfer of the parameters or the parameter cloning. The saved parameter set of the old camera is here transferred to the new camera that is thus immediately parameterized or configured in the same manner.

The control and evaluation unit is preferably configured to initiate a transfer to the memory of the new camera of the further parameter sets of a further camera that were stored in the memory of the no longer connected camera. This is again preferably a function as a cloning master. The new camera should also store all the parameter sets of the other cameras for the future. All the further cameras whose parameter set were stored in the old camera therefore send their parameter set to the new camera for storage there. Which cameras these are is preferably read from the device map. The parameter cloning therefore has two parts: On the one hand, the parameter set used by the old camera are transferred to the new camera that then works therewith. On the other hand, the parameter sets that were stored by the old camera for further cameras of the network are now also saved on the new camera.

The control and evaluation unit is preferably configured to recognize that it is still in an unconfigured state and to wait for communication requests of the network. Whereas previously properties of the camera were described for a role as a camera remaining in the network, in particular as a cloning master, the camera is preferably also prepared for a role as a replacement device. If the camera is in an unconfigured state, that is it is in particular set to works settings, it does not yet participate in a communication, but waits until it is integrated in the network. However, it preferably communicates its serial number or the like to the network so that other cameras can recognize that a new camera has been connected.

The control and evaluation unit is preferably configured to recognize that the network is not the one of the at least one further camera for which a further parameter set has been stored and to wait for communication requests of the network. In this case, the camera is not set to works settings or the like, but is rather already configured for a group. There is thus the risk that it attempts to communicate with the previous group and thereby interferes. The camera in accordance with this embodiment therefore checks whether one of the known cameras is connected at all for which it has saved a parameter set or that are on its device map. If no such partner is found, the camera assumes that it has been connected in a new group. It then substantially behaves as at works settings and waits until it is integrated in the new network.

The control and evaluation unit is preferably configured to compare a further parameter set stored in the memory with a further camera. Such a comparison takes place, for example, cyclically or on booting. A check is made whether the cameras still agree on the data of the used or mutually saved parameter sets. Otherwise, a camera would possibly be reconfigured or there may be a memory error. Memory errors can also be contained by a redundant storage within the camera. If the comparison produces a discrepancy, this can be reported. Otherwise that parameter set preferably has priority that a camera has stored for itself and this parameter set can again be mutually saved.

The control and evaluation unit is preferably configured to read codes in the image data. The camera thus becomes a camera-based code reader.

In an advantageous further development, a camera apparatus is provided with a plurality of cameras in accordance with the invention that are connected in a network. There can additionally be further cameras that do not take part in the mutual saving of parameter sets or there can be a plurality of clusters of cameras mutually saving one another. At least some of the cameras are preferably installed such that they together record objects in a detection zone by partially overlapping mutually complementing fields of vision. Cameras can, however, also have non-overlapping fields of vision, for example from different perspectives from above, from the sides, from below, from the front, from behind, and/or from an oblique perspective and can together observe a scene or an object, in particular a section of a conveying device for objects.

The camera apparatus is preferably configured as a reading tunnel for reading codes on objects that are conveyed through the reading tunnel. In this process, the cameras themselves read codes and/or codes are read downstream in a higher ranking system of individual images or an assembled overall image (image stitching).

The cameras preferably have the same design as one another. However, the cameras preferably have at least one individual feature such as a serial number that is also known to the control and evaluation unit and can thus be communicated. It is furthermore not precluded that the cameras are, for example, downward compatible devices of different dates of manufacture. A heterogenous arrangement with different cameras is also conceivable.

The method in accordance with the invention can be further developed in a similar manner and shows similar advantages in so doing. Such advantageous features are described in an exemplary, but not exclusive manner in the subordinate claims dependent on the independent claims.

Figure 2:
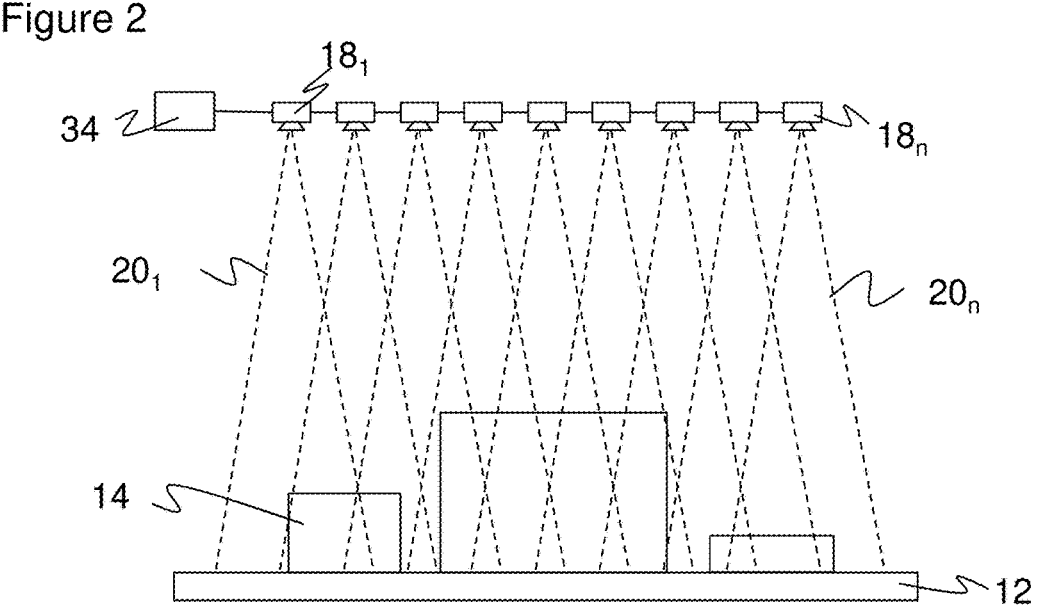
Figure 6:
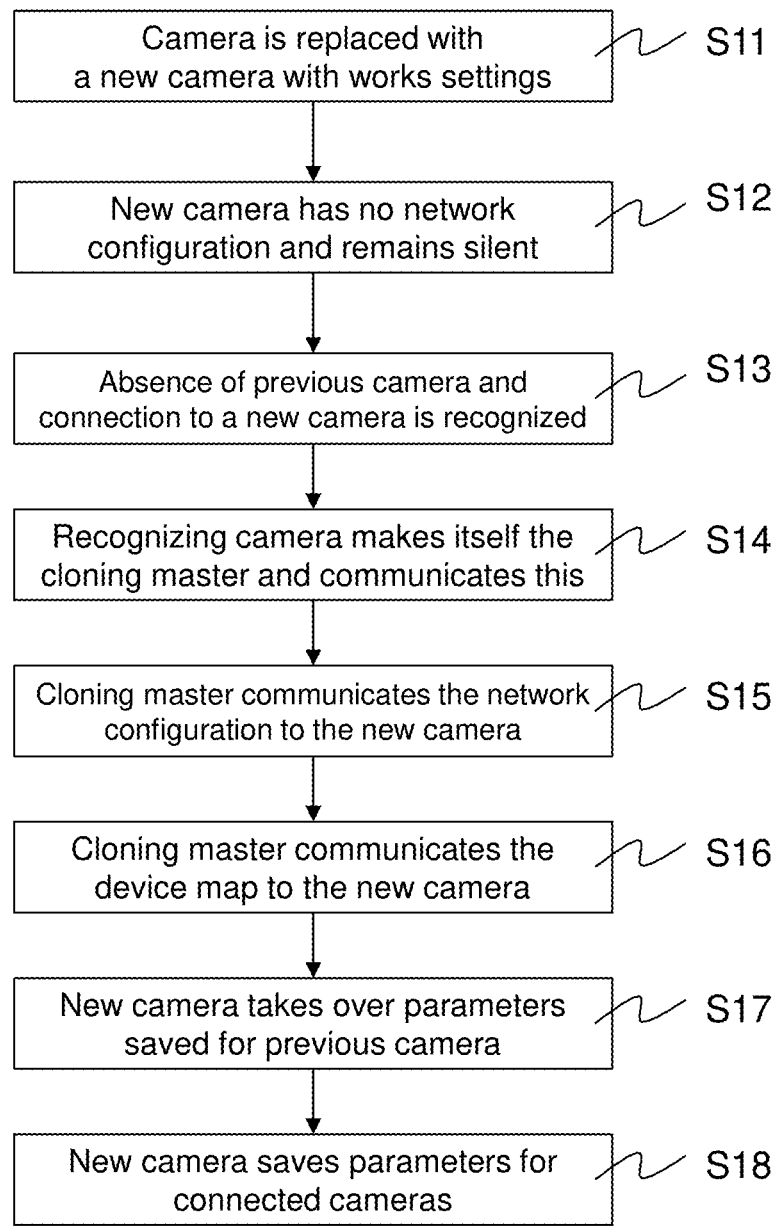
Figure 7:
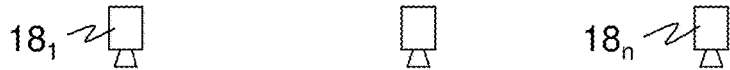
Figure 8:
Figure 9:
Figure 10:
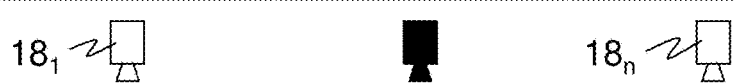
Figure 11:
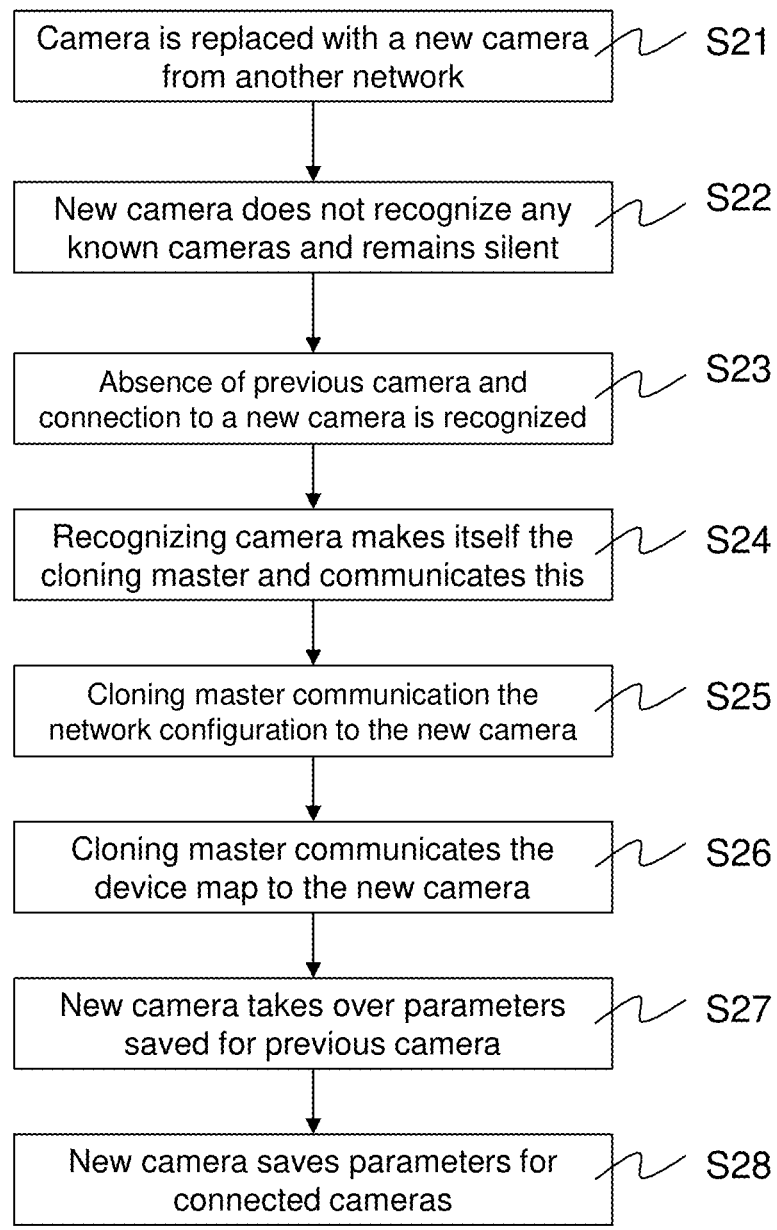

The invention will be explained in more detail in the following also with respect to further features and advantages by way of example with reference to embodiments and to the enclosed drawing. The Figures of the drawing show in:

FIG. 1 a schematic three-dimensional view of a camera apparatus above a conveyor belt with objects to be detected;

FIG. 2 a supplementary sectional representation of individual cameras of the camera apparatus with their fields of view;

FIG. 3 a block diagram of an individual camera;

FIG. 4 a flowchart of an initialization phase of a camera apparatus having a plurality of cameras;

FIG. 5 a representation of data and parameters stored in the cameras after the initialization phase;

FIG. 6 a flowchart for the transfer of parameters on a replacement of a camera, wherein the new camera has been set to works settings;

FIG. 7 a representation of data and parameters stored in the cameras directly after the connection of the new camera;

FIG. 8 a representation of data and parameters stored in the cameras after transfer of a network configuration to the new camera;

FIG. 9 a representation of data and parameters stored in the cameras after transfer of a device map to the new camera;

FIG. 10 a representation of data and parameters stored in the cameras after completion of the transfer of the parameters;

FIG. 11 a flowchart for the transfer of parameters on a replacement of a camera, wherein the new camera has been set to settings from a network in which it had previously been operated; and FIGS. 12-15 a representation of data and parameters stored in the cameras in accordance with FIGS. 8-11 for the flowchart of FIG. 11.

FIG. 1 shows a schematic three-dimensional view of or a multi-camera system or of a camera apparatus 10 above a conveyor belt 12 having objects 14 to be detected on which codes 16 are attached by way of example, but not necessarily. The conveyor belt 12 is an example for the production of a stream of objects 14 which move relative to the stationary camera apparatus 10. Alternatively, the camera apparatus 10 can also observe a scene without a conveyor belt 12. The camera apparatus 10 comprises a plurality of cameras $18_1 \ldots 18_n$, where n=4 by way of example in FIG. 1. In addition to the shown cameras $18_1 \ldots 18_n$ in a perspective from above, further cameras can be installed from a different direction, for example laterally, to detect further object sides. The cameras $18_1 \ldots 18_n$ are arranged in a row transversely to the conveyor belt 12, with other arrangements in a differing orientation or as a matrix, for example, also being conceivable.

FIG. 2 additionally shows the arrangement of the cameras $18_1 \ldots 18_n$ and their fields of view $20_1 \ldots 20_n$ above the conveyor belt 12 in a sectional representation, with now a different example with more cameras $18_1 \ldots 18_n$ being selected, and FIG. 3 shows an individual camera $18_j$. The cameras $18_1 \ldots 18_n$ each have an image sensor 22 having a plurality of light reception elements arranged to form a pixel row or a pixel matrix as well as an objective 24. A respective control and evaluation unit 26 reads image data and is responsible for camera-related control work and evaluations. The control and evaluation unit 26 has a memory 28 in which parameters, network configurations, and a device map having identities or addresses of further cameras $18_1 \ldots 18_n$ can be stored. Data, in particular parameters for other cameras $18_1 \ldots 18_n$, are also saved in the memory 28; this will be explained in more detail further below. The cameras $18_1 \ldots 18_n$ are linked to a network via a respective communication point 30, for instance via Ethernet or CAN. The cameras $18_1 \ldots 18_n$ furthermore preferably have an illumination 32 to illuminate their own fields of view $20_1 \ldots 20_n$ on a recording. A higher ranking control 34 can be provided in the network whose work can instead be taken over at least partly by a camera $18_1 \ldots 18_n$. The cameras $18_1 \ldots 18_n$ are preferably of the same design among one another to reduce system complexity. They can, however, work with different configurations and recording parameters.

In a preferred embodiment, the cameras $18_1 \ldots 18_n$ are configured as code readers in which the control and evaluation unit 26 additionally acts as a decoding unit for reading code information and corresponding pre-processing for localizing and preparing code regions. It is also conceivable to detect streams of objects 14 without codes 16 and accordingly to dispense with the decoding unit itself or its use, for example for an inspection or quality control. In addition, a decoding can also take place downstream outside the cameras $18_1 \ldots 18_n$ on their image data, in particular in the higher ranking control 34.

The conveyor belt 12 is too wide to be detected by an individual camera $18_1 \ldots 18_n$. The fields of view $20_1 \ldots 20_n$ of the cameras $18_1 \ldots 18_n$ therefore preferably complement one another in the transverse direction of the conveyor belt 12 with a partial mutual overlap. An optional geometry detection sensor 36, for example in the form of a distance measuring laser scanner known per se, is located above the individual cameras $18_1 \ldots 18_n$ with respect to the direction of movement of the conveyor belt 12 to measure the three-dimensional contour of the objects 14 on the conveyor belt 12 in advance, with dimensions, volume, position, and shape resulting therefrom. In addition, the geometry data can be used to trigger the recordings and to focus the cameras $18_1 \ldots 18_n$.

FIG. 4 shows a flowchart for an initialization phase of the camera apparatus. Only those steps among the large number of conceivable or required steps of an initial putting into operation are discussed here that are related to a mutual parameter saving and return parameter transfer.

The network is configured in a step S1, with every form of an automatic, manual, or semiautomatic configuration being possible. The cameras $18_1 \ldots 18_n$ are initially set to works settings, but have a unique serial number or another individual feature that could alternatively also be negotiated. The initialization can, for example, be coordinated by a master among the cameras $18_1 \ldots 18_n$ or by the higher ranking control 34. A device recognition takes place first. A distinguishable network address such as an IP address or a CAN node ID is then assigned to the recognized devices. The cameras $18_1 \ldots 18_n$ are thus able to communicate with one another over the network.

A device map is generated and distributed in a step S2. The device map, for example, includes the serial numbers, IP addresses, and node IDs of the connected cameras $18_1 \ldots 18_n$. It is sufficient for the mutual saving and transferring back of parameter sets for the device map of every camera $18_1 \ldots 18_n$ to include a further camera $18_1 \ldots 18_n$, but better two or more cameras $18_1 \ldots 18_n$, as a precaution for protection from a failure. The device maps can be thinned out accordingly before or after the distribution.

The parameter sets of the individual cameras $18_1 \ldots 18_n$ are mutually communicated and stored in the respective memory 28 in a step S3. This is also called parameter cloning. Which cameras $18_1 \ldots 18_n$ they respectively are is preferably decided with reference to the device maps. The device maps are therefore not necessarily complete representations of the camera apparatus 10, but only a section of the parameter cloning. There is thus at least a simple redundancy by storing a parameter set in a respective camera $18_1 \ldots 18_n$ itself and in its at least one partner, preferably double redundancy with two partners up to maximum security when each camera $18_1 \ldots 18_n$ stores the parameter sets for every other camera $18_1 \ldots 18_n$.

An exemplary result of the initialization phase is shown in FIG. 5. In order not to show too much information, only three cameras $18_1 \ldots 18_n$ are shown without thereby actually restricting their number. The cameras $18_1 \ldots 18_n$ will from here on frequently in a simplifying manner be called first, second, and third cameras, without reference numerals, in accordance with the column position in the table shown without these names having any special or even restrictive technical significance. The data naturally do not have to be written to the memory 28 in this form; FIG. 5 is one arbitrary representation of many. The respective serial numbers, that were already stored ex works, are in the first line. It must be remembered that a different unique feature such as a MAC address would equally be usable. The second line and third line show the network configuration by way of example with an IP address or a node ID that have been numbered consecutively for reasons of clarity. The fourth line includes the respective device map; the cameras are accordingly aware of one another, i.e. the first camera knows the second and third cameras and so forth. The respective saved parameter sets for the two other cameras are shown in the same manner in the fifth line. In addition, and not shown here, each camera holds its own parameter set in memory. The parameter sets are preferably associated via at least one of the features serial number, IP address, node ID. This facilitates the identification of a replacement device.

FIG. 6 shows a flowchart for a replacement of a camera $18_1 \ldots 18_n$ of the camera apparatus 10. A particularly advantageous automatic configuration is achieved with these steps, but each step that is not explicitly marked as indispensable is to be considered optional. FIGS. 7 to 10 illustrate intermediate results. A device exchange is very considerably simplified thanks to the automatic parameter cloning for which FIG. 6 shows an embodiment.

A defect is discovered or there is another reason for a replacement in a step S11. The new camera $18_1 \ldots 18_n$ is installed instead of the old camera $18_1 \ldots 18_n$, is connected to its connections for supply and network connection, and is then switched on. The new camera $18_1 \ldots 18_n$ automatically receives the configurations and parameters stored in the network on booting and is immediately ready for use. This will now be described in detail.

In this embodiment, the new camera $18_1 \ldots 18_n$ is initially set to works settings. It accordingly determines in a step S12 that it does not have a valid network configuration and remains silent. However, it transmits a general message with its identity to indicate its new connection.

FIG. 7 shows the stored information at this time in a representation similar to FIG. 5. New information or information particularly relevant to the explanation is printed in bold in each case. The previous serial numbers, network configurations, device maps, and saved parameter sets are furthermore stored in the first and second cameras. However, in part this relates to the old third camera that is no longer connected. Only its serial number and an initial setting for the IP address and node ID not valid in the network are stored in the third camera.

The absence of the old camera and the addition of the third camera is noticed in a step S13. The second camera is here by way of example the one that first recognizes the replacement. It communicates this to the other cameras, in particular by broadcast, and makes itself the cloning master in a step S14. It thus takes over a temporary master function for the communication in the further procedure in accordance with FIG. 6.

In a step S15, the second camera acting as the cloning master communicates a valid network configuration to the new third camera. This is preferably the still stored network configuration of the predecessor whose position the third camera now takes over. Alternatively, a new network configuration could also be assigned and communicated to all.

The third camera thus becomes a participant in the network and can communicate with the other cameras without interference.

FIG. 8 illustrates the information now stored in the cameras. With respect to FIG. 7, the default values for the IP address and the value node ID for the third camera are now overwritten with a valid network configuration. The second camera is shown dark from now on to illustrate its function as a cloning master. The tables would, however, not look different if, for example, the first camera acts as the cloning master.

In a step S16, the second camera acting as the cloning master determines current device maps with the new third camera and transfers these device maps to the other cameras. It is conceivable that the device map is tailored by the cloning master and/or in the receiving cameras because every camera is not necessarily responsible for the parameters of every other camera, but optionally makes a relevant selection.

FIG. 9 illustrates the result of this step S16. The old camera is replaced with the new third camera in the device maps of the first camera and of the second camera. The third camera now stores a device map having the two other cameras.

A first part of the actual parameter cloning then follows in a step S17. The third camera takes over the parameters stored for the old, replaced camera from the cloning master or from another camera responsible therefor. The third camera can thus replace the old camera without another parameterization or configuration. This functionally corresponds to the conventional step of inserting and reading the SD card of the old camera in the new camera.

The parameter cloning is completed by a second part in a step S18. The third camera receives the parameter set of the cameras registered to its device map, that is of the first camera and of the second camera, and saves them in its own memory 28. The third camera could thus now take over the role of the cloning master or at least of the outsourced parameter memory on a future replacement of the first or second cameras.

FIG. 10 shows the finally stored information. The third camera now has parameter sets for the two other cameras. Conversely, the first and second cameras continue to store the parameter set for the third camera. This parameter set is initially identical with that of the old device; 3 {2005 0003}=3 {2006 0128} therefore applies in the last line of the table. If, however, the third camera should be directly reconfigured, the first and second cameras thus hold the new parameter set of the third camera in future and no longer the obsolete parameter set of the replaced old device.

FIG. 11 shows a flowchart for an alternative embodiment and FIGS. 12 to 15 illustrate intermediate results, analog to FIGS. 7 to 10. Unlike the embodiment described with reference to FIGS. 6 to 10, the new camera, again the third camera, is now not a device at works settings, but was already used in another network.

A network configuration, device map, and saving of parameter sets for further cameras are therefore, unlike in step 11 of FIG. 6, already stored in the third camera in step 21. This is shown in FIG. 12, where values have already been entered everywhere in the last column that are, however, not valid in the new network, with the exception of the serial number.

There is now the challenge in a step S22 that the third camera initially does not know that it is now connected in a new network. It must be prevented that it disseminates its invalid stored parameter sets and interferes in the network communication. The third camera recognizes this situation in that none of the cameras entered in its device map can be reached. The third camera therefore remains silent and waits until a new network configuration, a new device map, and new parameter sets are transferred to it.

In another respect, this step is a further reason, in addition to the increased redundancy and safety, why every camera should preferably mutually save parameter sets with two further cameras. In the case of a device exchange, the only partner of the replaced device remaining in the network would namely otherwise erroneously assume that it is a completely new network because none of the cameras registered in its device map replies and that could result in inconsistent states.

The further steps S23 to S28 then no longer differ from the steps S13 to S18 of FIG. 6. The invalid old device map for the third camera is still shown in FIG. 13 and the parameter sets of the partners of the earlier network are still shown in FIGS. 13 and 14. They are successively overwritten. The invalid information could alternatively also be deleted as soon as the third camera has determined in step S22 that it is in a new network. FIGS. 13 to 15 would thus look exactly as FIGS. 8 to 10 except for the different serial number of the third camera.

Alternatively to the flowchart of FIG. 11, the new camera can first be set to works settings and then the flowchart of FIG. 6 can be used. This is, however, possibly a little awkward because the service engineer cannot easily address the new camera in isolation to trigger the reset. It is additionally unfavorable to require a manual intervention of the service engineer at all because this could be forgotten and thus represents an additional error source.

The invention claimed is:

1. A camera, comprising:
an image sensor for recording image data from a field of vision;
a communication interface for connection to at least one further camera in a network;
a control and evaluation unit for reading the image data; and
a memory in which a parameter set for the operation of the camera is stored,
wherein at least one further parameter set for the operation of the at least one further camera of the network is stored in the memory,
wherein a device map including an identification or address of the at least one further camera is stored in the memory,
wherein the control and evaluation unit is configured to recognize a camera replacement in the network when the at least one further camera is no longer connected in the network and a new camera is subsequently connected in the network, and
wherein the control and evaluation unit is further configured to report itself as a master to the network upon recognizing the camera replacement, the master being responsible for transferring the device map and the at least one further parameter set to the new camera.

2. The camera in accordance with claim 1,
wherein a network configuration is stored in the memory.

3. The camera in accordance with claim 1,
wherein the device map includes the identification or the address for ones of the camera and the at least one further camera which mutually save a parameter set for one another.

4. The camera in accordance with claim 1,
wherein further parameter sets for the operation of at least two further cameras of the network are stored in the memory.

5. The camera in accordance with claim 1,
wherein the control and evaluation unit is configured to communicate the network configuration of the no longer connected further camera to the new camera.

6. The camera in accordance with claim 1, wherein the control and evaluation unit is configured to communicate an updated device map to the network including the new camera.

7. The camera in accordance with claim 1, wherein the control and evaluation unit is configured to transfer the further parameter set stored for the previously connected further camera to the new camera.

8. The camera in accordance with claim 1, wherein the control and evaluation unit is configured to initiate a transfer to the memory of the new camera of the further parameter sets of a further camera that were stored in the memory of the no longer connected camera.

9. The camera in accordance with claim 1, wherein a control and evaluation unit of the new camera is configured to recognize that it is in a still unconfigured state and to wait for communication requests of the network and/or to recognize that the network is not the one of the at least one further camera for which a further parameter set has been stored and to wait for communication requests of the network.

10. The camera in accordance with claim 1,
wherein the control and evaluation unit is configured to compare a further parameter set stored in the memory with a further camera.

11. The camera in accordance with claim 1,
wherein the control and evaluation unit is configured to read codes in the image data.

12. A camera apparatus having a plurality of cameras that are connected in a network, the cameras each comprising an image sensor for recording image data from a field of vision, a communication interface for connection to at least one further camera in a network, a control and evaluation unit for reading the image data, and a memory in which a parameter set for the operation of the camera is stored, wherein at least one further parameter set for the operation of the at least one further camera of the network is stored in the memory,
wherein a device map including an identification or address of the at least one further camera is stored in the memory,
wherein the control and evaluation unit is configured to recognize a camera replacement in the network when the at least one further camera is no longer connected in the network and a new camera is subsequently connected in the network, and
wherein the control and evaluation unit is further configured to report itself as a master to the network upon recognizing the camera replacement, the master being responsible for transferring the device map and the at least one further parameter set to the new camera.

13. The camera apparatus in accordance with claim 12 that is configured as a reading tunnel for reading codes on objects that are conveyed through the reading tunnel.

14. A method for the replacement of a camera in a camera apparatus, comprising the steps of:
establishing a camera network including a plurality of cameras, wherein each of the cameras has a device map stored in memory including an identification or address of at least one further camera of the camera network, and wherein each of the cameras has a parameter set for operation of the corresponding one of the cameras stored in the memory, and wherein each of the cameras has a further parameter set for operation of the at least one further camera stored in the memory;
upon recognition of replacement of one of the cameras in the camera network with a new camera, one of the cameras reporting itself as a master to the network, the master being responsible for transferring the device map and the further parameter set to the new camera; and
transferring the further parameter set of a replaced one of the cameras and the device map to the new camera.

* * * * *